(12) United States Patent
Aokage

(10) Patent No.: US 8,854,256 B2
(45) Date of Patent: Oct. 7, 2014

(54) IMAGE CAPTURE APPARATUS AND METHOD OF CONTROLLING THE SAME

(71) Applicant: Canon Kabushiki Kaisha, Tokyo (JP)

(72) Inventor: Hironori Aokage, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/960,194

(22) Filed: Aug. 6, 2013

(65) Prior Publication Data

US 2013/0321658 A1 Dec. 5, 2013

Related U.S. Application Data

(63) Continuation of application No. PCT/JP2013/002444, filed on Apr. 10, 2013.

(30) Foreign Application Priority Data

Apr. 11, 2012 (JP) ................................ 2012-090596

(51) Int. Cl.
| | |
|---|---|
| *G06K 9/00* | (2006.01) |
| *G06K 9/40* | (2006.01) |
| *H04N 5/228* | (2006.01) |
| *H04N 5/217* | (2011.01) |
| *H04N 5/222* | (2006.01) |
| *H04N 9/67* | (2006.01) |
| *H04N 5/232* | (2006.01) |
| *H04N 9/04* | (2006.01) |
| *H04N 5/202* | (2006.01) |

(52) U.S. Cl.
CPC ............ *H04N 5/23245* (2013.01); *H04N 9/67* (2013.01); *H04N 9/045* (2013.01); *H04N 5/202* (2013.01)
USPC ........ 342/162; 382/167; 382/254; 348/222.1; 348/241; 348/333.01

(58) Field of Classification Search
CPC .......... H04N 9/64; H04N 9/646; H04N 9/735
USPC .......... 348/220.1, 222.1, 223.1, 229.1, 230.1, 348/241, 242, 254, 255, 256, 333.01; 382/162, 166, 167, 254, 274, 275, 276, 382/307, 309
See application file for complete search history.

(56) References Cited

U.S. PATENT DOCUMENTS

| 8,154,643 | B2 * | 4/2012 | Mizuno et al. ............ 348/333.01 |
| 2002/0196346 | A1 * | 12/2002 | Nishio et al. ............... 348/207.2 |
| 2004/0196394 | A1 * | 10/2004 | Nakajima ..................... 348/254 |
| 2008/0204581 | A1 * | 8/2008 | Tsugita et al. ............... 348/273 |
| 2011/0050949 | A1 * | 3/2011 | Kurokawa ................. 348/223.1 |

FOREIGN PATENT DOCUMENTS

| JP | 2008-072340 A | 3/2008 |
| JP | 2009-147463 A | 7/2009 |
| JP | 2011-055089 A | 3/2011 |

OTHER PUBLICATIONS

Recommendation ITU-R BT.601-7 (Mar. 2011) Studio Encoding Parameters of Digital Television for Standard 4:3 and Wide-Screen 16: 9 Aspect Rations [Retrieved Apr. 9, 2012], Internet <URL:http//www.itu.int/dms_pubrec/itu-r/rec/bt/R-REC-BT.601-7-201103-IIIPDF-E.pdf>.
Recommendation ITU-R BT.709.5 (Apr. 2002) Parameter Values for the HDTV Standards for Production and International Programme Exchange [Retrieved Apr. 9, 2012], Internet <URL:http://www.itu.int/dms_pubrec/itu-r/rec/bt/R-REC-BT.709-5-200204-IIIPDF-E.pdf>.

* cited by examiner

*Primary Examiner* — Twyler Haskins
*Assistant Examiner* — Peter Chon
(74) *Attorney, Agent, or Firm* — Cowan, Liebowitz & Latman, P.C.

(57) ABSTRACT

The image quality degradation of a moving image due to repeated application of color space conversion processing is suppressed. An image capture apparatus which supplies moving image signals to a plurality of output destinations decides the contents of color space conversion processing before and after color processing so as to minimize the number of times of color conversion processing required to match with the color spaces required by output destinations to which priority should be given.

11 Claims, 10 Drawing Sheets

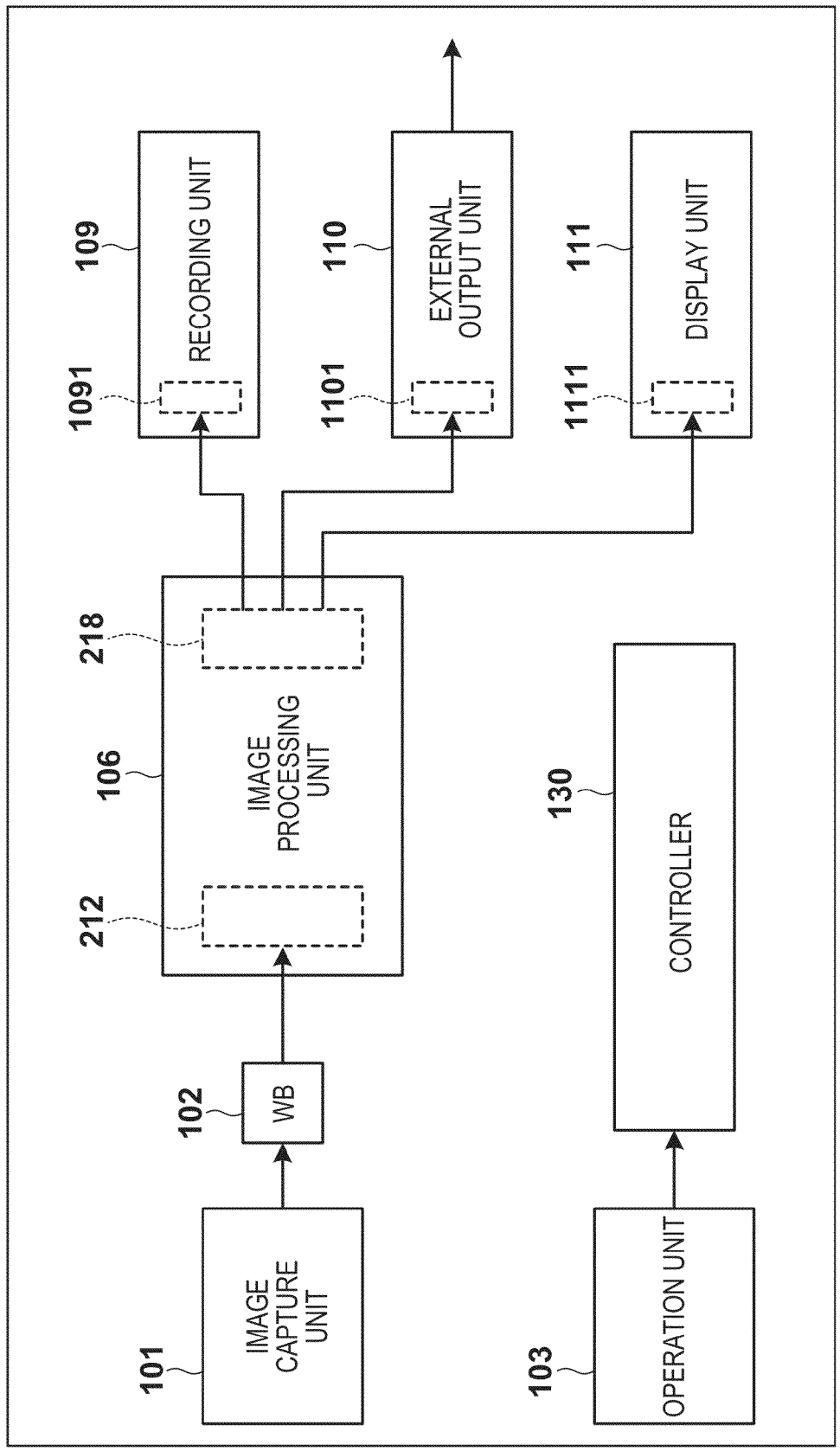

F I G. 8
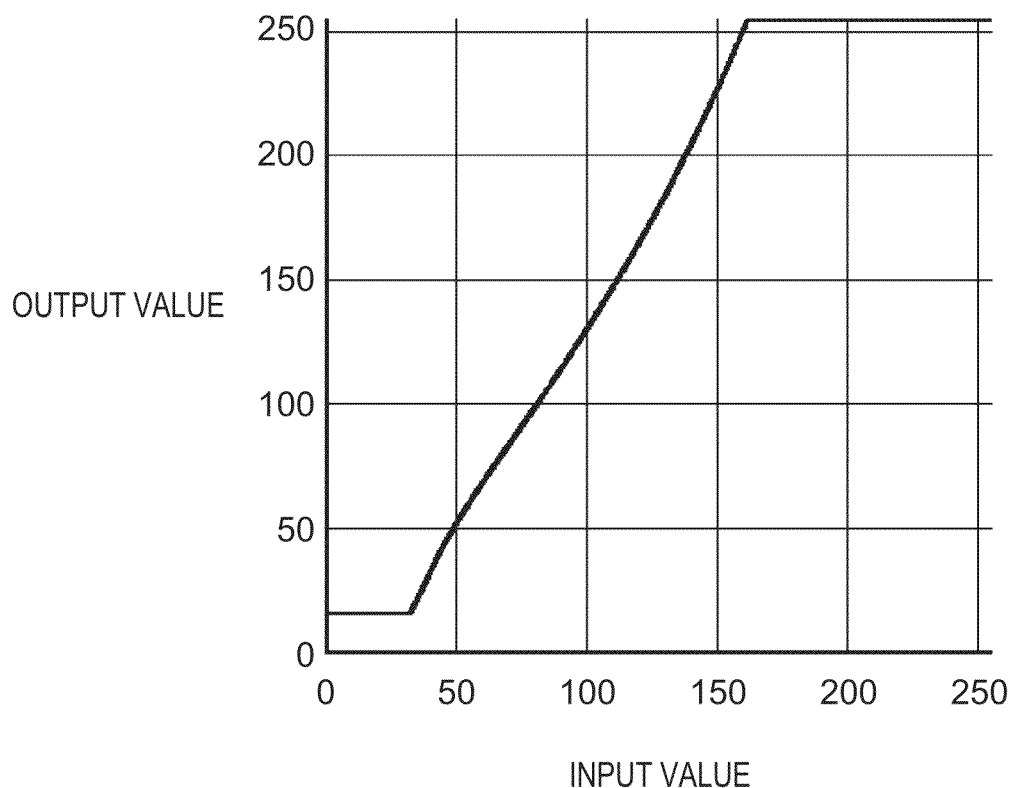

FIG. 9

| | STILL IMAGE (AT TIME OF NORMAL SHOOTING MODE) | MOVING IMAGE (AT TIME OF NORMAL SHOOTING MODE) | MOVING IMAGE (AT TIME OF SHOOTING MODE DEDICATED TO RECORDING MOVIE) |
|---|---|---|---|
| PRIMARY (COLOR GAMUT) | BT.709 | BT.709 | BT.709 |
| GAMMA | BT.601 | BT.601 | LOG GAMMA |
| MATRIX COEFFICIENT | BT.601 | BT.709 | BT.709 |

IMAGE CAPTURE APPARATUS AND METHOD OF CONTROLLING THE SAME

CROSS-REFERENCE TO RELATED APPLICATIONS

This application is a continuation of International Application No. PCT/JP2013/002444, filed Apr. 10, 2013 the entire disclosure of which is hereby incorporated by reference.

BACKGROUND OF THE INVENTION

1. Field of the Invention

The present invention relates to an image capture apparatus and a method of controlling the same.

2. Description of the Related Art

Conventionally, video cameras and still cameras have differed in many respects. The former apparatuses have been apparatuses designed to capture only moving images, whereas the latter apparatuses have been apparatuses designed to capture only still images. However, both the types of apparatuses have started using image sensors and have digitally processed images. This has been reducing the differences between them. Recently, the still image shooting function of a video camera and the movie shooting function of a still camera have greatly advanced from the initial levels to such an extent that even a compact still camera like that built in a cellular phone can perform movie shooting with a full HD (high definition) resolution.

Recently, in particular, since a digital still camera with interchangeable lenses has also been equipped with a movie shooting function, movie shooting by the still camera has attracted a great deal of attention. This may be because a digital still camera with interchangeable lenses uses a large-sized image sensor with a large number of pixels, interchanging lenses facilitates changing the angle of view, and allows still image shooting with high image quality.

When performing shooting operation premised on being subjected to editing as in the case of movies and television, the apparatus performs recording with importance being attached to tone gradation to minimize blown-out highlights and blocked-up shadows so as to ensure an adjustable range at the time of editing. More specifically, it is known that recording is performed by using nonlinear input-output characteristics that exhibit a logarithmic increase with an increase in luminance value. Such nonlinear input-output characteristics are called Log or Log gamma and defined as a function or table. In addition, further converting film scan data, converted by the defined Log gamma, by using Cineon LOG or the like proposed for film scan data recording proposed by Kodak, U.S.A. allows the data to be handled as image data similar in characteristic to the photosensitivity of a photograph film. Using Log gamma can maintain high tone gradation by suppressing blown-out highlights and blocked-up shadows. However, the recorded moving image becomes a low-contrast image, with a dark portion becoming brighter and a bright portion becoming darker. For this reason, this image is not suitable for appreciation without any change, and hence needs to be converted into linear tone characteristics with respect to human visual features in the end.

In television or movie production, moving images having Log gamma characteristics are generally edited. Conventionally, however, the movie shooting function of a digital still camera is designed to record moving images having tone characteristics or contrast suitable for appreciation without any editing processing after shooting operation (to be referred to as postproduction processing). For this reason, digital still cameras have also been required to support movie recording using Log gamma.

In an image signal, a color space to be filled is specified in accordance with specifications. For example, such a color space is specified by JPEG generally used for still images or the ITU-R (International Telecommunication Unit-Radio) BT.601 specification for SD (Standard Definition) television and video signals (Recommendation ITU-R BT.601-7 (March 2011) Studio encoding parameters of digital television for standard 4:3 and wide-screen 16:9 aspect ratios [retrieved Apr. 9, 2012], Internet <URL: http://www.itu.int/dms_ pubrec/itu-r/rec/bt/R-REC-BT.601-7-201103-I!!PDF-E.pdf>). As for HD (High Definition) television and video signals, the ITU-R BT.709 specification specifies such a color space (Recommendation ITU-R BT.709-5 (April 2002) Parameter values for the HDTV standards for production and international programme exchange [retrieved Apr. 9, 2012], Internet <URL: http://www.itu.int/dms_pubrec/itu-r/rec/bt/R-REC-BT.709-5-200204-I!!PDF-E.pdf>).

In addition, still image recording uses the color space specified by the BT.601 specification (to be simply referred to as the BT.601 color space hereinafter), and hence internal processing in a digital still camera is generally premised on an image signal in the BT.601 color space. At the time of HD movie shooting, the apparatus processes an image signal in the BT.601 color space and converts the signal into a signal in the BT.709 color space before recording or external output operation. This is because when the apparatus performs still image shooting during movie shooting (or still image generation from a moving image), it is necessary to match the color of the still image with that of the moving image. In this case, the color spaces specified by the BT.601 and BT.709 specifications aim at RGB to YUV color conversion matrix coefficients defined by the respective specifications but do not aim at primary (gamut) or gamma based on color specifications.

However, since color space conversion is computation processing, repeated computation processing may cause image quality degradation due to computation errors. For this reason, the smaller the number of times of application of color space conversion, the better. However, upon processing HD movie shooting using Log gamma like conventional movie shooting, the apparatus performs color signal processing or luminance signal processing after conversion to a signal in the BT.601 color space, and then converts the signal into a signal in the BT.709 color space at the time of recording. In this case, the apparatus applies color space conversion processing to an image signal at least twice in the interval between the instant the signal is output from the image sensor and the instant the signal is recorded.

SUMMARY OF THE INVENTION

The present invention provides an image capture apparatus which can suppress image quality degradation of a moving image due to repeated application of color space conversion processing and a method of controlling the apparatus.

According to an aspect of the present invention, there is provided an image capture apparatus comprising: a first conversion unit that converts an image signal output from an image sensor into an image signal in a first color space; a signal processing unit that applies color processing to the image signal in the first color space and outputs the image signal; a recording signal generation unit that generates an image signal for movie recording from the image signal output from the signal processing unit, the recording signal generation unit including a second conversion unit that converts the image signal output from the signal processing unit into an image signal in a second color space if the second color space required for the image signal for movie recording differs from the first color space; a display signal generation unit that generates an image signal for display to be displayed on a display device from the image signal output from the signal processing unit, the display signal generation unit including a third conversion unit that converts the image signal output from the signal processing unit into an image signal in a third color space if the third color space required for the image signal for display differs from the first color space; and a control unit that controls operations of the first conversion unit, the second conversion unit, and the third conversion unit, wherein the control unit controls the operations of the first conversion unit, the second conversion unit, and the third conversion unit so as to minimize the number of times of color space conversion processing applied in a process of generating a prioritized one of the image signal for movie recording and the image signal for display.

According to another aspect of the present invention, there is provided a method of controlling an image capture apparatus, wherein the image capture apparatus comprises: a first conversion unit that converts an image signal output from an image sensor into an image signal in a first color space; a signal processing unit that applies color processing to the image signal in the first color space and outputs the image signal; a recording signal generation unit that generates an image signal for movie recording from the image signal output from the signal processing unit, the recording signal generation unit including a second conversion unit that converts the image signal output from the signal processing unit into an image signal in a second color space if the second color space required for the image signal for movie recording differs from the first color space; and a display signal generation unit that generates an image signal for display to be displayed on a display device from the image signal output from the signal processing unit, the display signal generation unit including a third conversion unit that converts the image signal output from the signal processing unit into an image signal in a third color space if the third color space required for the image signal for display differs from the first color space, the method comprising: a control step of controlling the operations of the first conversion unit, the second conversion unit, and the third conversion unit so as to minimize the number of times of color space conversion processing applied in a process of generating a prioritized one of the image signal for movie recording and the image signal for display.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments of the invention and, together with the description, serve to explain the principles of the present invention.

FIG. 1 is a block diagram showing an example of the arrangement of a digital still camera as an example of an image capture apparatus according to an embodiment of the present invention;

FIG. 8 is a graph showing an example of the characteristics of a viewing LUT; and FIG. 9 is a view showing the relationship between shooting modes and recorded images in the embodiment of the present invention.

DESCRIPTION OF THE EMBODIMENTS

The exemplary embodiments of the present invention will be described below with reference to the accompanying drawings.

FIG. 1 is a block diagram showing an example of the arrangement associated with image capturing, developing, and outputting in a digital still camera 100 (to be simply referred to as a digital camera hereinafter) as an example of an image capture apparatus according to an embodiment of the present invention. A controller 130 includes a CPU and memories such as a ROM and a RAM. The controller 130 controls each unit described below and implements part or all of the function of each unit. Note that at least part of the arrangement described below may be implemented by the CPU of the controller 130 in a software manner, or hardware, or cooperation between hardware and software.

Figure 2A:
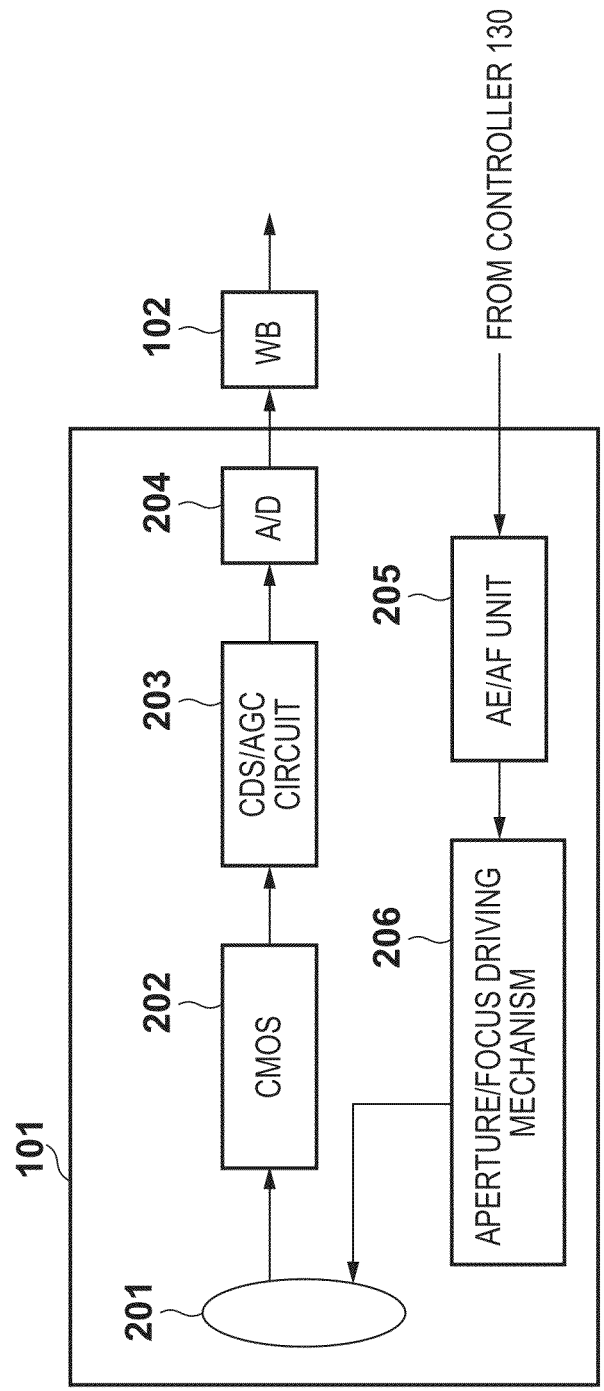
FIG. 2A is a block diagram showing the details of an image capture unit in FIG. 1.

An image capture unit 101 includes an imaging optical system and an image sensor. The image capture unit 101 converts an optical image formed on the image capture plane of the image sensor into an electrical signal, converts the acquired electrical signal into a digital signal, and outputs it. FIG. 2A shows an example of the arrangement of the image capture unit 101. Referring to FIG. 2A, an imaging optical system 201 forms an object image in its field of view (image capture range) onto the image capture plane of a CMOS 202 as an image sensor. Note that the image sensor to be used is not limited to a CMOS and may be another type of photoelectric conversion device such as a CCD.

A CDS/AGC circuit 203 performs correlated double sampling/gain adjustment for the electrical signals obtained from the CMOS 202. An A/D converter 204 digitally converts the signal output from the CDS/AGC circuit 203 and outputs the resultant signal as an image signal. The imaging optical system 201 includes a driving mechanism 206 for an aperture and a focus lens. An AE/AF unit 205 controls the driving mechanism 206 in accordance with an instruction from the controller 130. The console unit 205 and the driving mechanism 206 implement an automatic focus detection (AF) function and an automatic exposure control (AE) function.

Referring back to FIG. 1, a WB unit 102 performs white balance adjustment for the image signal output from the image capture unit 101 (A/D converter 204). The image signal whose white balance is adjusted by the WB unit 102 is supplied to an image processing unit 106. The detailed operation of the image processing unit 106 will be described later.

An operation unit 103 is an input device group including switches, buttons, keys, dial, touch panel with which the user inputs various types of settings and instructions to the digital still camera 100. Note that the operation unit 103 may use line-of-sight detection, speech recognition, and the like in addition to operation on physical mechanisms.

The operation unit 103 typically includes a release button, menu display button, arrow keys, decision/execution button, and shooting mode setting dial.

The controller 130 detects the operation of the operation unit 103 and controls the respective units so as to implement operations corresponding to detected operation contents. Note that the controller 130 displays a GUI screen such as a menu screen on a display unit 111 or displays setting information, shooting information, and the like of the digital still camera 100 on the display unit 111 upon superimposing them on the image for display output from the image processing unit 106.

Figure 2B:
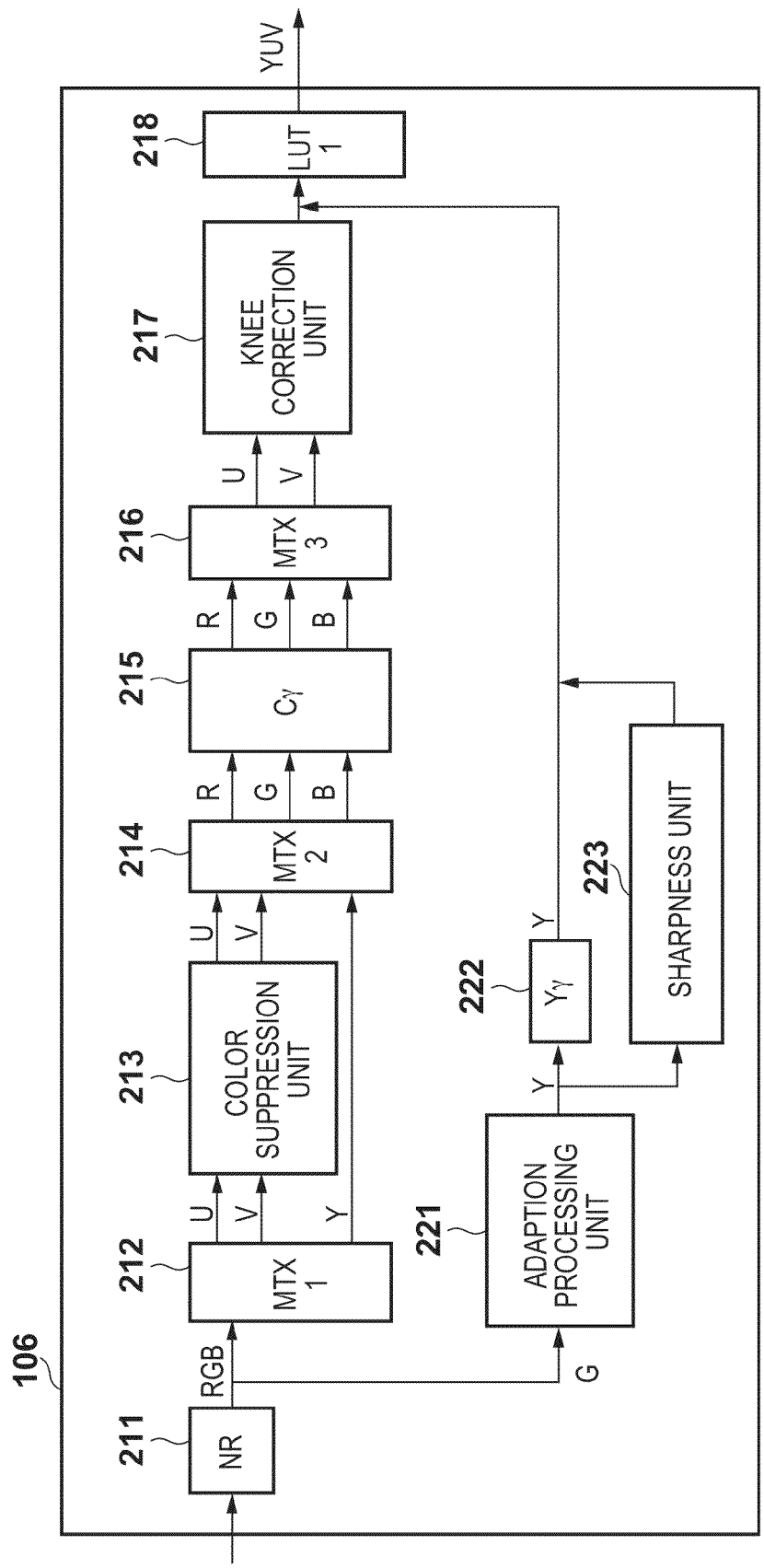
FIG. 2B is a block diagram showing the details of an image processing unit in FIG. 1.

FIG. 2B shows an example of the detailed functional arrangement of the image processing unit 106. A noise removal unit (NR) 211 applies noise removal processing to a white balance adjusted image signal. The chrominance signals and luminance signal of the image signal output from the noise removal unit 211 are concurrently processed. In a color processing unit constituted by blocks 212 to 217, the first matrix (MTX) 212 converts the image signal (RGB) output from the noise removal unit 211 into a YUV signal in a predetermined first color space.

For example, it is possible to convert an image signal in the RGB format into an image signal in the YUV (YCbCr) format in the BT.601 color space and the BT.709 color space according to the following equations:

RGB→YUV (BT.601)

$$Y=0.29891 \times R+0.58661 \times G+0.11448 \times B$$

$$U=-0.16874 \times R-0.33126 \times G+0.50000 \times B$$

$$V=0.50000 \times R-0.41869 \times G-0.08131 \times B$$

RGB→YUV (BT.709)

$$Y=0.2126 \times R+0.7152 \times G+0.0722 \times B$$

$$U=-0.1146 \times R-0.3854 \times G+0.5000 \times B$$

$$V=0.50000 \times R-0.4542 \times G-0.0458 \times B$$

The controller 130 makes setting to cause the first matrix 212 to convert an image signal into a YUV signal in the BT.601 color space or the BT.709 color space.

The first matrix 212 also performs matrix conversion to absorb variations due to the inherent spectral characteristics of the image sensor (CMOS) 202.

The color suppression unit 213 adjusts (suppresses) the gain of the color value of a high-luminance portion to maintain white balance at the time of saturation.

The second matrix 214 converts the YUV signal including the UV signal processed by the color suppression unit 213 into an RGB signal for γ processing. The Cγ processing unit 215 performs γ processing for the image signal (RGB signal) obtained by the second matrix 214. The third matrix 216 converts the output (RGB signal) from the Cγ processing unit 215 into a YUV signal again. The knee correction unit 217 receives the UV signal of the YUV signal output from the third matrix 216 and compresses a high-saturation color space to make the image signal fall within a target color space.

On the other hand, the luminance processing unit constituted by blocks 221 to 223 receives the G component of the image signal (RGB signal) output from the noise removal unit 211. In the luminance processing unit, first of all, the adaptation processing unit 221 generates a Y signal by performing adaptation processing for a G signal to maintain a band. The Yγ processing unit 222 performs γ processing for the Y signal generated by the adaptation processing unit 221. In addition, the output from the adaptation processing unit 221 is supplied to the sharpness unit 223. The sharpness unit 223 detects a sharpness amount from the input Y signal and adds it to the output from the Yγ processing unit 222.

Figure 7:
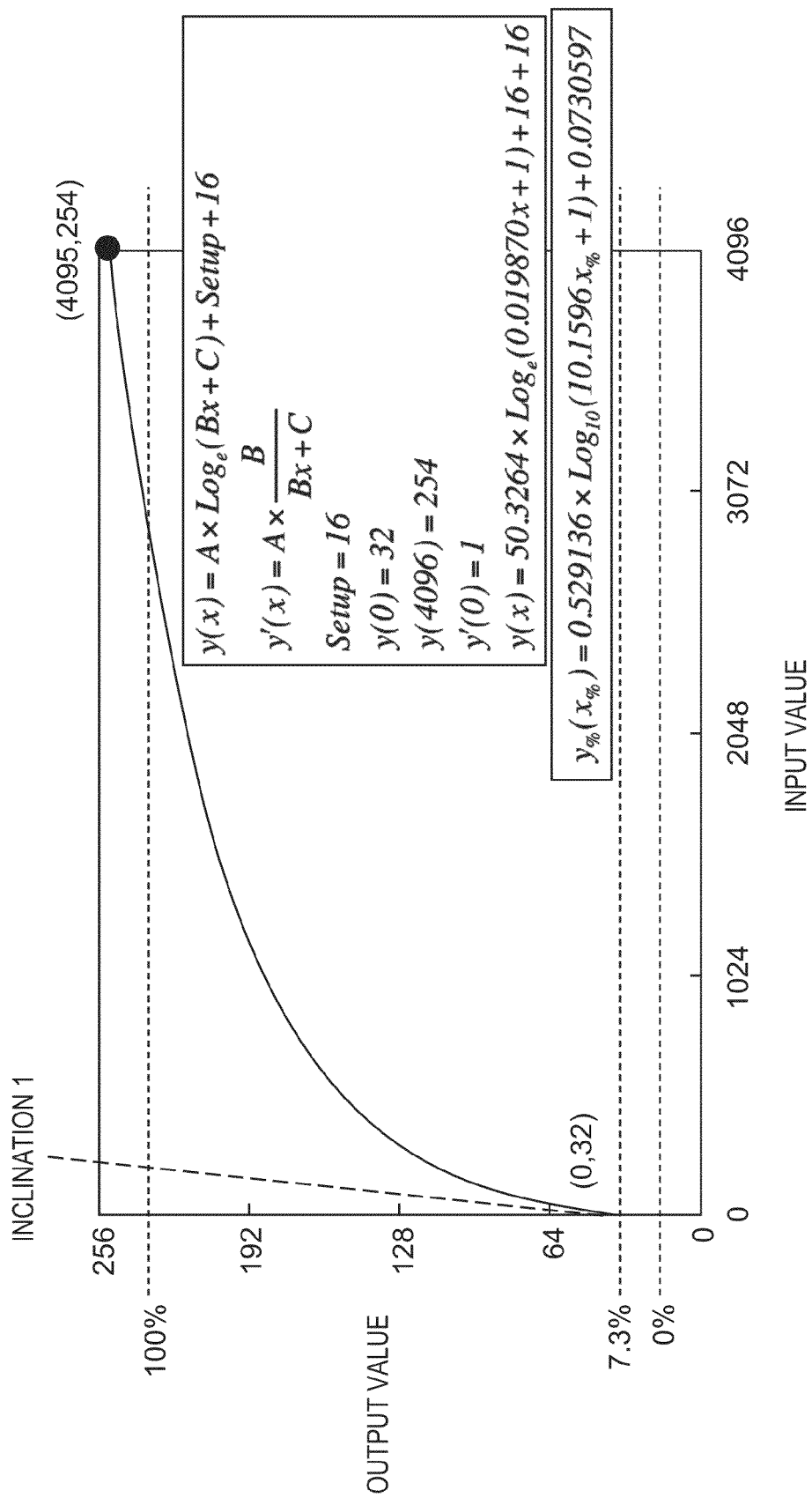
FIG. 7 is a graph showing the input-output characteristics of Log gamma defined by a function in the embodiment of the present invention.

When converting a shot image by applying a gamma curve having nonlinear input-output characteristics including Log gamma, the controller 130 sets gamma characteristics (input-output characteristics) to be used for the Cγ processing unit 215 and the Yγ processing unit 222. As described above, Log gamma means nonlinear input-output characteristics where an output value logarithmically increases with a linear increase in input value, as shown in, for example, FIG. 7. That is, Log gamma is input-output characteristics represented by the following logarithmic equation:

$$\text{output value}=A \times \log 10(B \times \text{input value}+C)+D$$

where 0<A <1 and B, C, and D are constants. Assume that in the case of 8-bit data, A=0.529136, B=10.1596, C=1.0, and D=0.0730597. This makes it possible to prevent blocked-up shadows of a dark portion in a slightly offset state, maintain the tone of an intermediate luminance portion at a minimum number of bits, and maintain the tone of a bright portion by preventing blown-out highlights up to saturation.

When the user sets this Log gamma, the apparatus operates in the shooting mode dedicated to recording movie. Alternatively, when the user sets the shooting mode dedicated to recording movie shooting mode as a shooting mode, the apparatus automatically applies the above Log gamma conversion.

Note that when shooting only still images, the apparatus applies BT.601 gamma basically designed for still images, as shown in FIG. 9. In addition, when performing still image shooting in the normal shooting mode capable of still image shooting during movie recording, especially still image shooting during movie recording, the apparatus also applies BT.601 gamma basically designed for still images because it is necessary to match the image quality of a still image with that of a moving image which are shot at the same timing. Furthermore, the apparatus performs conversion upon manually or automatically setting a gamma in accordance with a scene in which an object is located, for example, scenery, evening view, or human portrait. As shown in FIG. 9, BT.709 sets information about still images in the normal shooting mode and primary (gamut) in the shooting mode dedicated to recording movie.

An output signal (U, V) from the knee correction unit 217 and the signal (Y) obtained by the luminance processing unit are supplied to a first lookup table (to be referred to as a first LUT) 218. The image processing unit 106 then generates a final YUV signal and outputs it. Note that the color processing unit and the first LUT 218 of the image processing unit 106 constitute a signal processing unit.

Referring back to FIG. 1, a recording unit 109 removes noise by using, for example, the correlativity between the frames of an input YUV signal. Thereafter, the recording unit 109 converts an image signal after noise removal into an image signal in the second color space by using a fourth matrix 1091, as needed, thereby generating an image signal for movie recording. The controller 130 makes settings to determine whether the fourth matrix 1091 performs color space conversion. If the fourth matrix 1091 is to perform color space conversion, the controller 130 makes settings to determine which type of conversion is performed. In addition, the recording unit 109 generates an image file conforming to a preset recording file format (for example, Exif: Exchangeable image file format). The recording unit 109 then records the image file on a recording medium such as a memory card or hard disk.

An external output unit 110 generates an image signal for external output operation. In this case, the external output unit 110 generates a signal to be output to the outside via HDMI® (High-Definition Multimedia Interface). However, the external output unit 110 may generate a signal conforming to other specifications. The external output unit executes color space conversion processing by using a fifth matrix 1101, as needed. The controller 130 makes settings to determine whether to perform color space conversion by using the fifth matrix 1101. When performing color space conversion by using the fifth matrix 1101, the controller 130 makes settings to determine which type of conversion is performed. The external output unit 110 may convert a resolution as needed. When, for example, outputting a signal from HDMI, the external output unit 110 converts the resolution into any one of the resolutions specified by the HDMI specification (for example, 1920×1080 or 1280×720).

The display unit 111 generates a display image signal and causes the display device (the LCD provided on the rear surface of the digital still camera 100 in this case) of the digital still camera 100 to display the image. The display unit 111 converts the resolution of an image into a resolution supported by the display device, and applies a LUT for tone correction to the image, as needed. In this case, it is necessary to apply the LUT when monitoring the image obtained by movie shooting while applying Log gamma or when playing back a moving image shot by applying Log gamma. As described above, if the moving image shot by applying Log gamma is directly displayed, the shooting result cannot be properly evaluated. For this reason, the apparatus performs display operation by using a LUT for simulating a state in which processing is performed by applying gamma implementing linear tone or the like to visual properties. Such a LUT is called a viewing LUT. More specifically, this LUT has characteristics that increase the contrast of an intermediate luminance portion which has been suppressed by Log gamma, as shown in FIG. 8. This implements brightness conforming to a standard video color space (for example, BT.709). That is, for example, the user checks the tone of an image before conversion with the viewing LUT at the time of shooting operation, and can perform shooting operation while picturing a final image in mind after conversion with the viewing LUT. The apparatus does not apply the viewing LUT to any image data obtained by using a gamma curve other than Log gamma. It is also possible to perform simulation by applying a gamma LUT corresponding to each environment.

The display unit 111 converts an image signal into an image signal in the third color space by using a sixth matrix 1111, as needed. The controller 130 makes settings to determine whether to perform color space conversion by using the sixth matrix 1111. When performing color space conversion by using the sixth matrix 1111, the controller 130 makes settings to determine which type of conversion is performed. The display unit 111 supplies the image signal for display, to which LUT and color space conversion have been applied as needed, to the display device to display it.

Color space conversion processing at the time of HD movie recording in a conventional digital still camera will be described before the description of color space conversion processing operation of the digital still camera 100 with the above arrangement.

Figure 3:
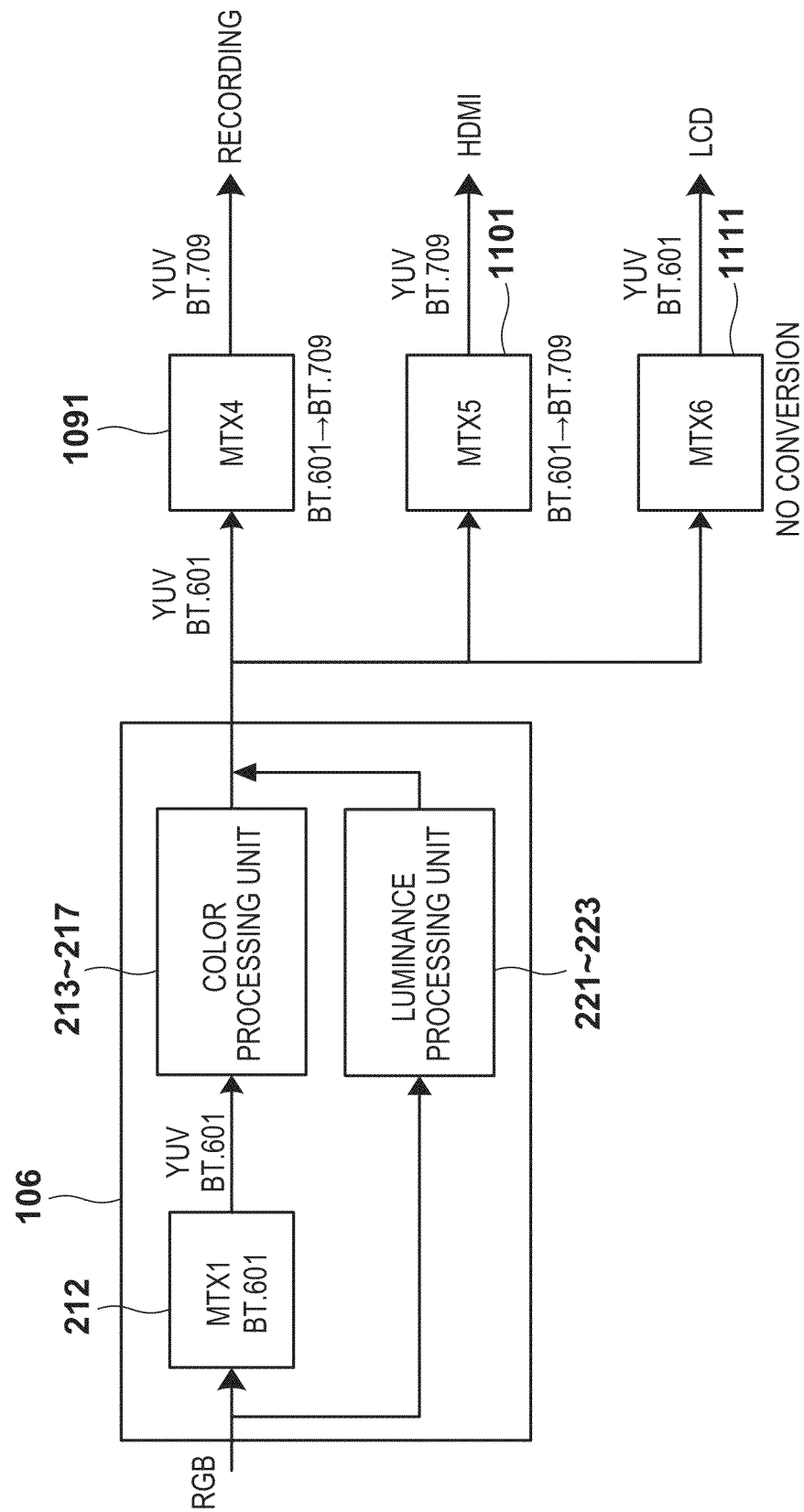
FIG. 3 is a block diagram schematically showing a procedure for conventional color space conversion processing.

FIG. 3 schematically shows an arrangement, of the digital still camera 100, which is associated with color space conversion processing in an extracted state. The reference numerals are common to FIGS. 1, 2A, and 2B.

The image processing unit 106 receives an image signal in the RGB format from the image capture unit 101. The first matrix 212 converts the image signal in the RGB format into an image signal in the YUV format in the BT.601 color space. Conversion to the BT.601 color space has been widely practiced at still image shooting operation in digital cameras.

Still images are generally output as JPEG files. The RGB-YUV matrix coefficients specified by JPEG are the same as the matrix coefficients defined by BT.601. Performing BT.601 conversion in advance will obviate the necessity to perform subsequent matrix conversion. It is therefore possible to give priority to the image quality of a still image output as a JPEG file. The data having undergone color processing is supplied in the YUV format in the BT.601 color space to the recording unit 109, the external output unit 110, and the display unit 111.

As described above, since an HD moving image needs to be an image signal in the BT.709 color space, the fourth matrix 1091 of the recording unit 109 converts an image signal in the YUV format in the BT.601 color space into an image signal in the YUV format in the BT.709 color space. Note that it is possible to obtain an arithmetic expression for converting an image signal in the YUV format from the BT.601 color space to the BT.709 color space (or the other way around) without changing the format based on the mutual relationship between conversion expressions for conversion from a signal in the above RGB format into signals in the YUV format in the respective color spaces.

Likewise, the external output unit 110 converts an image signal in the YUV format in the BT.601 color space into an image signal in the YUV format in the BT.709 color space by using the fifth matrix 1101, when outputting the signal with an HD resolution such as HDMI.

The display device of the digital still camera 100 in this embodiment requires an image signal in the BT.601 color space, and hence the sixth matrix 1111 of the display unit 111 supplies the signal in the YUV format in the BT.601 color space to the subsequent stage without performing color space conversion processing.

As described above, in the conventional arrangement, when performing HD movie shooting, the apparatus converts an image signal into an image signal in the YUV format in the BT.601 color space by using the first matrix 212, and then converts the image signal into an image signal in the YUV format in the BT.709 color space by using the fourth matrix 1091.

Figure 4:
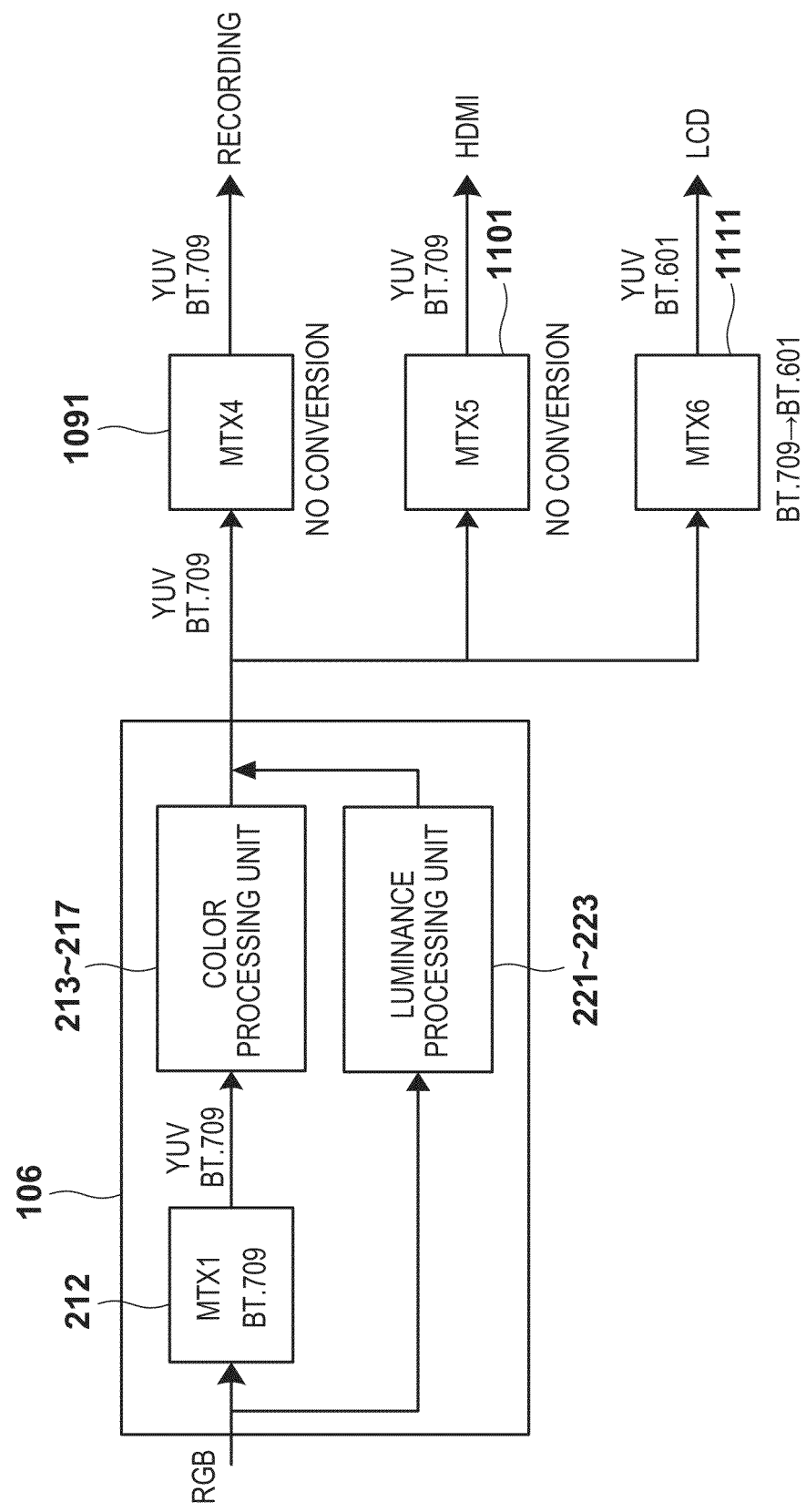
FIG. 4 is a block diagram schematically showing a procedure for color space conversion processing in the embodiment of the present invention.

The color space conversion processing operation of the digital still camera 100 according to this embodiment will be described with reference to FIG. 4. Like FIG. 3, FIG. 4 schematically shows an arrangement, of the digital still camera 100, which is associated with color space conversion processing in an extracted state. The reference numerals are common to FIGS. 1 to 3.

Color space conversion processing at the time of movie shooting operation using Log gamma will be described below. At the time of movie shooting operation using Log gamma, there is no consideration of the possibility of using still image shooting during movie shooting or moving image frames as still images, unlike a case in which other gammas (input-output characteristics where an output value does not logarithmically increase with a linear increase in input value) are applied. That is, there is no need to match with the color space used for still images.

For this reason, when performing movie shooting operation using Log gamma, the controller 130 sets the first matrix 212 so as to convert an image signal into an image signal in the YUV format in the BT.709 color space identical to the color space required for a recording signal instead of the YUV format in the BT.601 color space. When performing color processing as well, the apparatus executes processing for an image signal in the BT.709 color space, as needed. If it is necessary to change the contents of color processing in accordance with the color space of an image signal, the controller 130 issues processing switch instructions to necessary blocks and change set values such as parameters.

The image processing unit 106 therefore outputs an image in the YUV format in the BT.709 color space instead of the YUV format in the BT.601 color space. This obviates the necessity to color space conversion in the recording unit 109 and the external output unit 110. For this reason, the controller 130 makes settings to inhibit the fourth and fifth matrices 1101 and 1111 from performing color space conversion. This makes it possible to decrease the number of times of color space conversion processing applied to an image signal for movie recording to which priority should be given to one, which is two in the case of FIG. 3.

On the other hand, the display unit 111 needs to perform conversion to an image signal in the YUV format in the BT.601 color space. The controller 130 makes settings to cause the sixth matrix 1111 to convert an image signal in the YUV format in the BT.709 color space into an image signal in the YUV format in the BT.601 color space.

Figure 5:
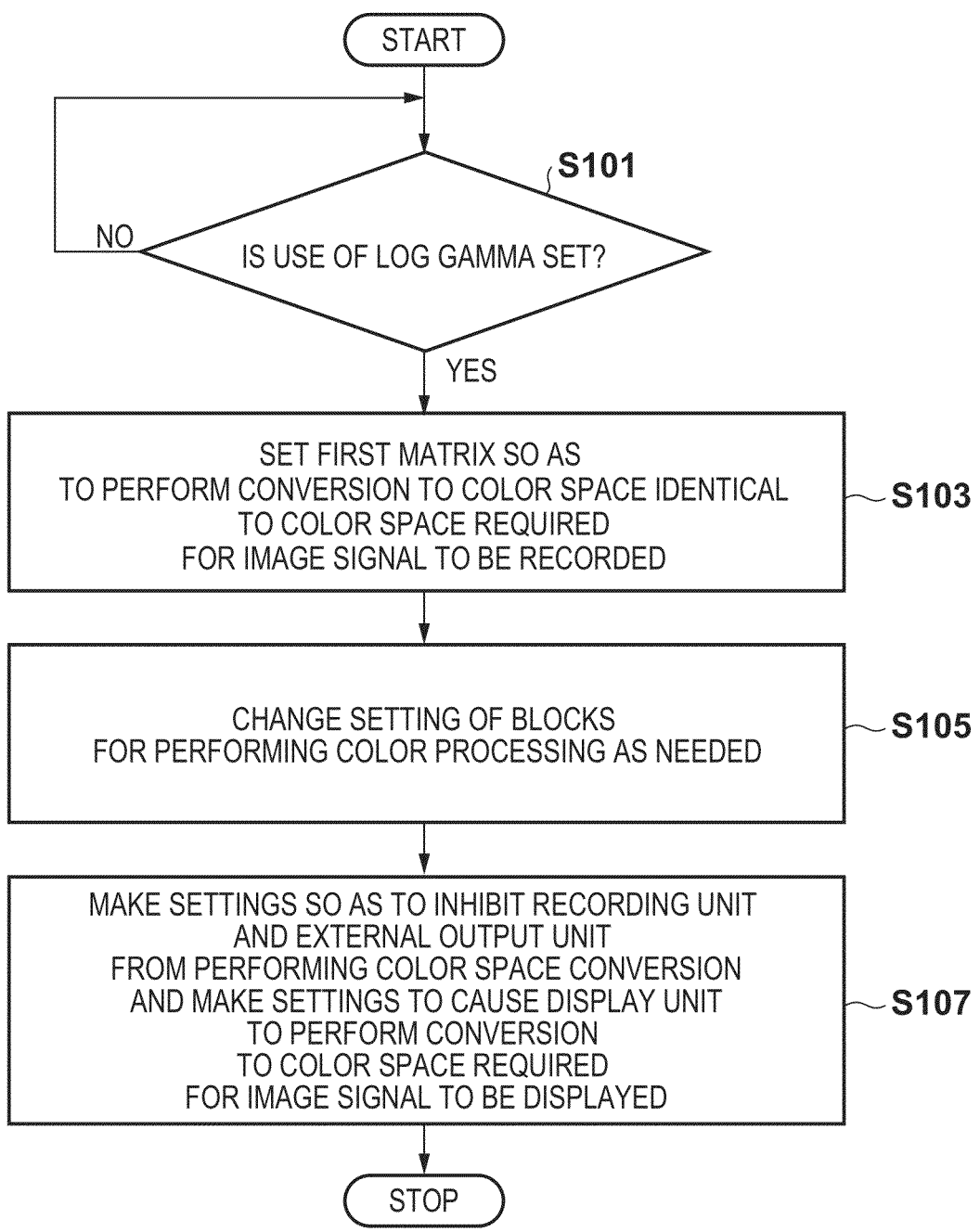
FIG. 5 is a flowchart for explaining the operation of a controller in the embodiment of the present invention.

The operation of the controller 130 will be described with reference to the flowchart of FIG. 5. In step S101, the controller 130 determines whether Log gamma has been used. If, for example, the user selects and executes (decides) a setting item 311 for use/nonuse of Log gamma included in a Log gamma setting menu screen via the operation unit 103, the controller 130 determines that settings have been made to use Log gamma.

If settings have been made to use Log gamma, the controller 130 sets, in step S103, Log gamma in gamma characteristics (input-output characteristics) used by the Cγ processing unit 215 and the Yγ processing unit 222.

When setting the use of Log gamma, the controller 130 makes settings to cause the first matrix 212 of the image processing unit 106 to perform conversion to an image signal in the YUV format in a color space identical to a color space required to record a moving image converted by Log gamma. In this embodiment, the controller 130 sets the first matrix 212 so as to convert an image signal in the RGB format into an image signal in the YUV format in the BT.709 color space.

In step S105, the controller 130 issues an instruction to change the contents of processing with respect to the blocks 213 to 217 designed to perform color processing (to change set parameters), if it is necessary to change the contents of the processing accompanying a change in color space.

Note that the controller 130 can store in advance set values for constitute elements associated with color space conversion processing and color processing in a referenceable memory such as a nonvolatile memory in correspondence with gamma characteristics which can be set. When set gamma characteristics are changed, the controller 130 can change settings concerning necessary functional blocks in accordance with the set gamma characteristics by referring to the nonvolatile memory.

In step S107, the controller 130 makes settings to inhibit the recording unit 109 (fourth matrix 1091) and the external output unit 110 (fifth matrix 1101) from performing color space conversion. On the other hand, the controller 130 makes settings to cause the display unit 111 (sixth matrix 1111) to perform conversion to a color space required for a display signal. In this embodiment, the controller 130 makes settings to cause the sixth matrix 1111 to convert an image signal in the YUV format in the BT.709 color space into an image signal in the YUV format in the BT.601 color space.

(Modification)

For the sake of easy understanding, the description has been made on the assumption that conversion by the first matrix 212 is the only color space conversion required for an image signal for recording when the use of Log gamma is set. However, it is sometimes preferable to perform partial correction in addition to uniform mapping computation throughout a logical color space by matrix computation. In such a case, it is possible to implement color space conversion by using a combination of matrix computation and a lookup table. Using the lookup table can perform correction for only a specific color gamut in the color space.

Figure 6:
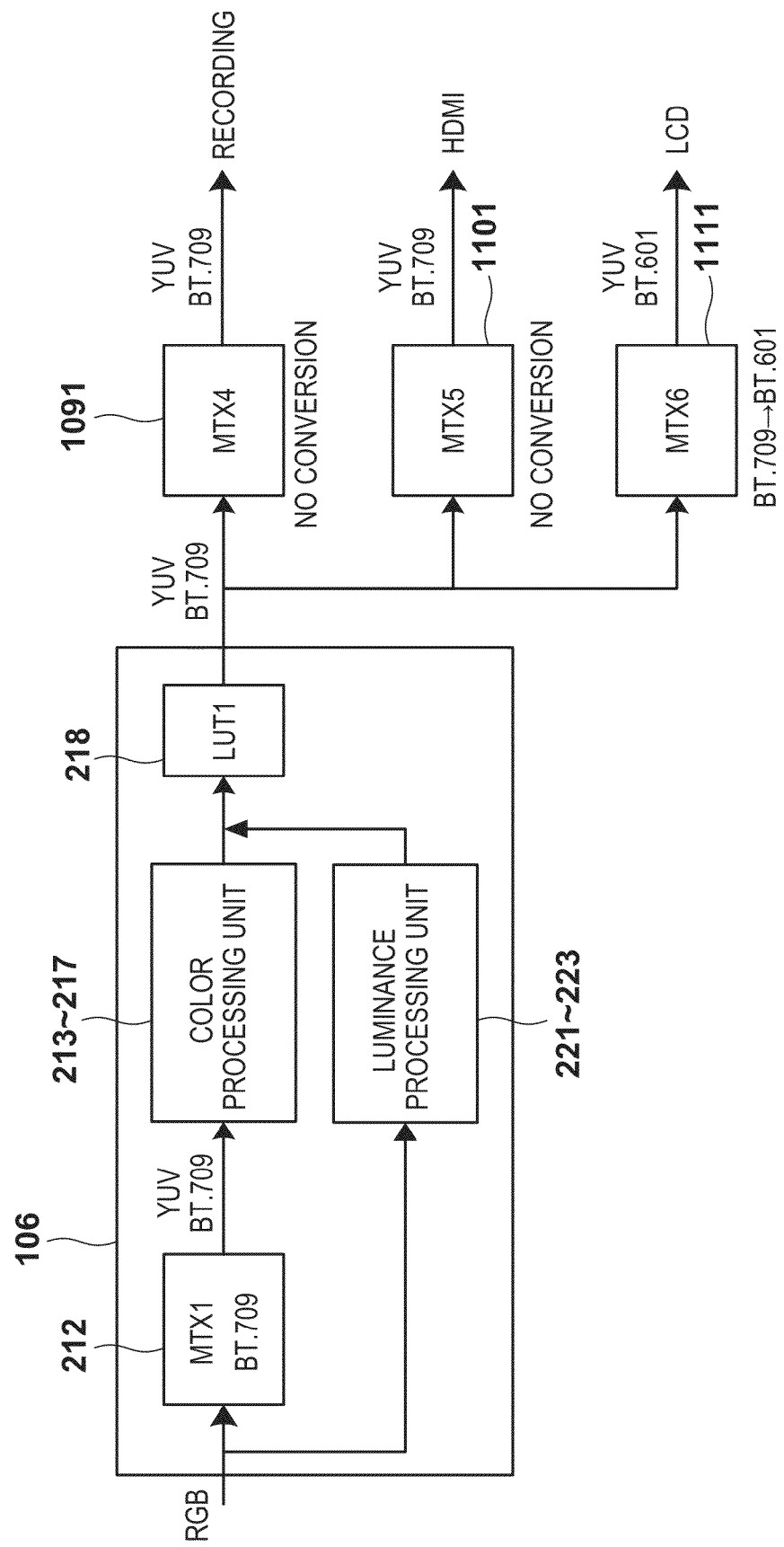
FIG. 6 is a block diagram schematically showing a procedure for color space conversion processing according to a modification of the embodiment of the present invention.

In this case, it is preferable to perform correction using a lookup table after color processing or luminance processing. For this reason, as shown in FIG. 6, it is preferable to perform correction by using the first LUT 218 which generates a final YUV signal from the image processing unit 106.

As described above, according to this embodiment, the image capture apparatus capable of performing movie shooting by using Log gamma is configured to perform color processing or luminance processing for an image signal after converting it into an image signal in a color space identical to the color space required for a recording signal, when performing movie shooting using Log gamma. This can substantially decrease, by one, the number of times of color space conversion processing applied until an image signal is output from the image sensor and recorded, and reduce image quality degradation as compared with the case of using the movie shooting function of a conventional digital still camera without any change. Log gamma is intentionally defined by a narrow dynamic range like 16 to 254 even for 8-bit data to optimize data for movie or television production. In order to maintain high image quality, therefore, it is more effective to decrease the number of times of color conversion which may cause tone jump.

In addition, a pixel tone range can be considered in the same manner as the above color space. That is, in the normal shooting mode capable of performing still image shooting during movie recording, since it is necessary to match the image quality of a still image with that of a moving image at a shooting timing, the apparatus does not convert the range into different tone ranges for moving images and still images. If the apparatus converts the range into the respective dedicated tone ranges, since the apparatus performs this conversion in the subsequent color conversion step, image quality degradation tends to occur.

In the case of the shooting mode dedicated to recording movie, as shown in FIG. 9, Log gamma is used, and there is no need to match image quality with that of a still image. For this reason, to record an image signal in the range of 16 to 245 for digital cinema and movie production, the image processing unit 106 performs processing in the range of 16 to 245 first but does not perform range conversion in the subsequent step. This can avoid image quality degradation as in the case of using matrix conversion.

Although this embodiment has exemplified conversion between the BT.709 color space and the BT.601 color space, the present invention does not aim at conversion between these specific color spaces. For example, the present invention can be applied to conversion between the color spaces specified by ACES (Academy Color Encode Specification) proposed by the AMPAS (Academy of Motion Picture Arts and Sciences) specification. In this case, an LMT (Look Modification Transform) file describing the contents of image processing is associated with or recorded on image data. The first embodiment may be configured to generate an LMT file in the CTL (Color Transform Language) format as the description language proposed by AMPAS (Academy of Motion Picture Arts and Sciences). CTL is an interpreter-type language. This language interprets the instructions described in an LMT file and can apply image processing conforming to the instructions to an input image file. Upon receiving image data in which an LMT file is recorded, the image processing apparatus can execute image processing described in the set LMT file.

Furthermore, in this embodiment, color spaces required for image signals for recording operation, external output operation, and display operation are merely examples. Therefore, identical color spaces are not always required for image signals for recording operation and external output operation, and the present invention is not limited to such a case. In addition, the three systems, namely recording operation, external output operation, and display operation, are merely examples. The number of systems is not limited to any specific number as long as it is a plural number.

The present invention is characterized in that the image capture apparatus which supplies moving image signals to a plurality of output destinations decides the contents of color space conversion processing before and after color processing and luminance processing so as to minimize the number of times of color conversion processing required to match with the color spaces required by output destinations to which priority should be given. More specifically, the apparatus is configured to minimize the number of times of color space conversion processing to be applied to an image signal corresponding to an output form to which priority should be given in the interval between the instant the image signal is output from the image sensor and the instant the signal becomes an image signal corresponding to a final output form (recording, external output, display, or the like). If, therefore, a higher priority is given to recording operation than to display operation, the apparatus sets contents of color space conversion matrix processing so as to minimize the number of times of color space conversion processing to be applied in the process of generating an image signal for display. In addition, performing necessary color space conversion processing on the upstream side (image sensor side) of the process as much as possible can further suppress image quality degradation.

Although the present invention is especially effective at the time of movie shooting operation using Log gamma, the effect of suppressing image quality degradation by minimizing the number of times of color space conversion processing in a signal system which should give priority to image quality is not limited to the case of movie shooting operation using Log gamma.

The present invention is also implemented by executing the following processing. That is, this is the processing of supplying software (programs) for implementing the functions of the above embodiments to a system or apparatus via a network or various types of storage media and making the computer (or the CPU, MPU, or the like) of the system or apparatus read out and execute the software.

The present invention is not limited to the above embodiments and various changes and modifications can be made within the spirit and scope of the present invention. Therefore, to apprise the public of the scope of the present invention, the following claims are made.

This application claims priority from Japanese Patent Application No. 2012-090596 filed Apr. 11, 2012, which is hereby incorporated by reference herein in its entirety.

What is claimed is:

1. An image processing apparatus comprising:
a first conversion unit configured to convert an image signal output from an image sensor into an image signal in a first color space;
a signal processing unit configured to apply color processing to the image signal in the first color space and outputs the image signal;
a recording signal generation unit configured to generate an image signal for movie recording from the image signal output from said signal processing unit, said recording signal generation unit including a second conversion unit configured to convert the image signal output from said signal processing unit into an image signal in a second color space required for the image signal for movie recording if the second color space differs from the first color space;
a display signal generation unit configured to generate an image signal for display to be displayed on a display device from the image signal output from said signal processing unit, said display signal generation unit including a third conversion unit configured to convert the image signal output from said signal processing unit into an image signal in a third color space required for the image signal for display if the third color space differs from the first color space; and
a control unit configured to set the first color space to the first conversion unit, the second color space to the second conversion unit, and the third color space to the third conversion unit,
wherein in a case where the image processing apparatus is to record a moving image converted with input-output characteristics where an output value logarithmically increases with a linear increase in input value, said control unit sets the first color space and the second color space so as to match the first color space with the second color space.

2. The image processing apparatus according to claim 1, wherein in a case where the image processing apparatus is to record a moving image which is not converted with the input-output characteristics where an output value logarithmically increases with a linear increase in input value, said control unit sets the first color space and the third color space so as to match the first color space with the third color space.

3. The image processing apparatus according to claim 1, wherein in a case where the image processing apparatus is to record a still image, said control unit sets the first color space and the third color space so as to match the first color space with the third color space.

4. The image processing apparatus according to claim 1, wherein the second color space is a color space conforming to a BT.709 specification.

5. The image processing apparatus according to claim 1, wherein the third color space is a color space conforming to a BT.601 specification.

6. An image processing apparatus comprising:
a first conversion unit configured to convert an image signal output from an image sensor into an image signal in a first color space;
a signal processing unit configured to apply color processing to the image signal in the first color space and outputs the image signal;
a recording signal generation unit configured to generate an image signal for movie recording from the image signal output from said signal processing unit, said recording signal generation unit including a second conversion unit configured to convert the image signal output from said signal processing unit into an image signal in a second color space required for the image signal for movie recording if the second color space differs from the first color space;

a display signal generation unit configured to generate an image signal for display to be displayed on a display device from the image signal output from said signal processing unit, said display signal generation unit including a third conversion unit configured to convert the image signal output from said signal processing unit into an image signal in a third color space required for the image signal for display if the third color space differs from the first color space; and a control unit configured to set the first color space to the first conversion unit, the second color space to the second conversion unit, and the third color space to the third conversion unit, wherein in a case where the image processing apparatus is to record a moving image converted with input-output characteristics where an output value logarithmically increases with a linear increase in input value, said control unit sets the first color space and the second color space both conforming to a BT.709 specification.

7. The image processing apparatus according to claim 6, wherein in a case where the image processing apparatus is to record a moving image converted with input-output characteristics where an output value logarithmically increases with a linear increase in input value, said control unit sets the third color space conforming to a BT.601 specification.

8. The image processing apparatus according to claim 6, wherein in a case where the image processing apparatus is to record a still image, said control unit set the first color space and the third color space both conforming to a BT.601 specification.

9. The image processing apparatus according to claim 6, wherein in a case where the image processing apparatus is to record a still image, said control unit sets the second color space conforming to a BT.709 specification.

10. A method for image processing to an image signal output from an image sensor, the method comprising:
   converting the image signal output from said image sensor into an image signal in a first color space;
   applying color processing to the image signal in the first color space and outputting the image signal;
   generating an image signal for movie recording from the output image signal, the generating comprising the steps of:
      converting the output image signal into an image signal in a second color space required for the image signal for movie recording if the second color space differs from the first color space;
   generating an image signal for display to be displayed on a display device from the output image signal, said generating comprising;
      converting the output image signal into an image signal in a third color space required for the image signal for display if the third color space differs from the first color space, and
   wherein in a case where the image processing is to record a moving image converted with input-output characteristics where an output value logarithmically increases with a linear increase in input value, the first and the second color spaces are set so as to match the first color space with the second color space.

11. A method for image processing to an image signal output from an image sensor, the method comprising the steps of:
   converting the image signal output from said image sensor into an image signal in a first color space;
   applying color processing to the image signal in the first color space and outputting the image signal;
   generating an image signal for movie recording from the output image signal, the generating comprising:
      converting the output image signal into an image signal in a second color space required for the image signal for movie recording if the second color space differs from the first color space;
   generating an image signal for display to be displayed on a display device from the output image signal, said generating comprising;
      converting the output image signal into an image signal in a third color space required for the image signal for display if the third color space differs from the first color space, and
   wherein in a case where the image processing is to record a moving image converted with input-output characteristics where an output value logarithmically increases with a linear increase in input value, the first color space and the second color space both conforming to a BT.709 specification are set.

* * * * *